US 9,092,757 B2

(12) United States Patent
Antin et al.

(10) Patent No.: US 9,092,757 B2
(45) Date of Patent: Jul. 28, 2015

(54) METHODS AND SYSTEMS FOR PERSONALIZING USER EXPERIENCE BASED ON ATTITUDE PREDICTION

(75) Inventors: Judd Antin, Berkeley, CA (US); David Ayman Shamma, San Francisco, CA (US); Elizabeth Churchill, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 247 days.

(21) Appl. No.: 13/467,438

(22) Filed: May 9, 2012

(65) Prior Publication Data
US 2013/0304686 A1 Nov. 14, 2013

(51) Int. Cl.
G06N 5/00 (2006.01)
G06F 1/00 (2006.01)
G06Q 10/10 (2012.01)
G06Q 30/02 (2012.01)

(52) U.S. Cl.
CPC .............. *G06Q 10/10* (2013.01); *G06Q 30/02* (2013.01)

(58) Field of Classification Search
CPC .................................. G06Q 50/01; G06N 5/02
USPC .......................................................... 706/46
See application file for complete search history.

(56) References Cited

U.S. PATENT DOCUMENTS

2006/0122834 A1* 6/2006 Bennett .......................... 704/256
2011/0007142 A1* 1/2011 Perez et al. ..................... 348/77
2011/0295892 A1* 12/2011 Evans et al. .................... 707/776

* cited by examiner

Primary Examiner — Jeffrey A Gaffin
Assistant Examiner — Kalpana Bharadwaj
(74) Attorney, Agent, or Firm — Berkeley Law & Technology Group, LLP

(57) ABSTRACT

The disclosure herein relates to a system and method for personalizing an online experience of a user based on the user's attitude. Attitude models are constructed from user activity data that are able to infer or determine attitudes for a user. Based on the attitudes derived from applying the attitude models, attitude profiles are created for the users. As a users engage in various types of online interactions, the attitude profiles associated with the users can be utilized to personalize the online experience of the user.

21 Claims, 5 Drawing Sheets

METHODS AND SYSTEMS FOR PERSONALIZING USER EXPERIENCE BASED ON ATTITUDE PREDICTION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present application is directed to methods and systems for personalizing the presentation of content, and more particularly, to personalizing the presentation of content to users based on predicted attitudes of the users.

BACKGROUND OF THE INVENTION

In online environments that are saturated with content and advertisements, there is a need to personalize user experiences in this regard to suit the individual needs, tastes, and goals of the user and advertiser in an effective manner. Prior methods for personalizing user experiences in this regard focus primarily on known user characteristics and preferences. These methods, however, do not account for user attitudes regarding the specifics of their online experience. Without taking into account relevant user attitudes, it is not possible (1) to create personalized online experiences that are sensitive to user's attitudes about their interactions with other users and/or online systems, (2) to intelligently personalize content, features, and interactions with the user based an understanding of user's goals, needs, beliefs, and desires, (3) to provide feedback and reassurance in online situations that may make users uncomfortable or likely to stop using a given system, and/or (4) to leverage adaptive incentive systems which provide incentives for online participation that are appropriate for both the online context and an individual user's motivational profile.

Accordingly, there is a need for systems that personalize users' online experiences based on individual user attitudes.

SUMMARY OF THE INVENTION

The disclosure herein generally relates to a system and method that is able to personalize an online experience of a user based on the user's attitude. Attitude models are constructed from user activity data that are able to infer or determine a user's attitude toward a variety of different online interactions (e.g., interactions with online systems or other users). Based on the information derived from the attitude models, attitude profiles can be created for the users. The attitude profiles include attitude preference information that indicates the user's attitudes toward particular types of online interactions. As a user engages in various types of online interactions, the attitude profile associated with the user can personalize the online experience of the user. For example, the user's online experience can be personalized by tailoring interfaces or content presented to the user, personalizing advertisements that are displayed to the user or personalizing incentives that are presented to the user.

In accordance with the present principles, a method is disclosed for personalizing an online experience. An attitude model is constructed from activity stream data for determining an attitude of a user. The attitude model is stored on a non-transitory computer readable storage medium. The attitude model is applied to generate an attitude profile that includes attitude preference information indicating the user's attitude toward at least one type of online interaction. The online experience of the user is personalized based on the attitude preference information in the attitude profile.

In accordance with the present principles, a system for personalizing an online experience. The system includes a processor and a non-transitory computer-readable storage medium configured to store a personalization system. The personalization system comprises a model builder, attitude predictor and personalizer. The model builder is configured to construct an attitude model from activity stream data for determining an attitude of a user. The attitude predictor is configured to apply the attitude model to generate an attitude profile for the user that includes attitude preference information indicating the user's attitude toward at least one type of online interaction. The personalizer is configured to personalize the online experience of the user based on the attitude preference information in the attitude profile.

These and other features and advantages will become apparent from the following detailed description of illustrative embodiments thereof, which is to be read in connection with the accompanying drawings.

BRIEF DESCRIPTION OF DRAWINGS

The methods and systems discussed herein are illustrated in the figures of the accompanying drawings which are meant to be exemplary and not limiting, in which like references are intended to refer to like or corresponding parts, and in which.

DETAILED DESCRIPTION OF THE EMBODIMENTS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
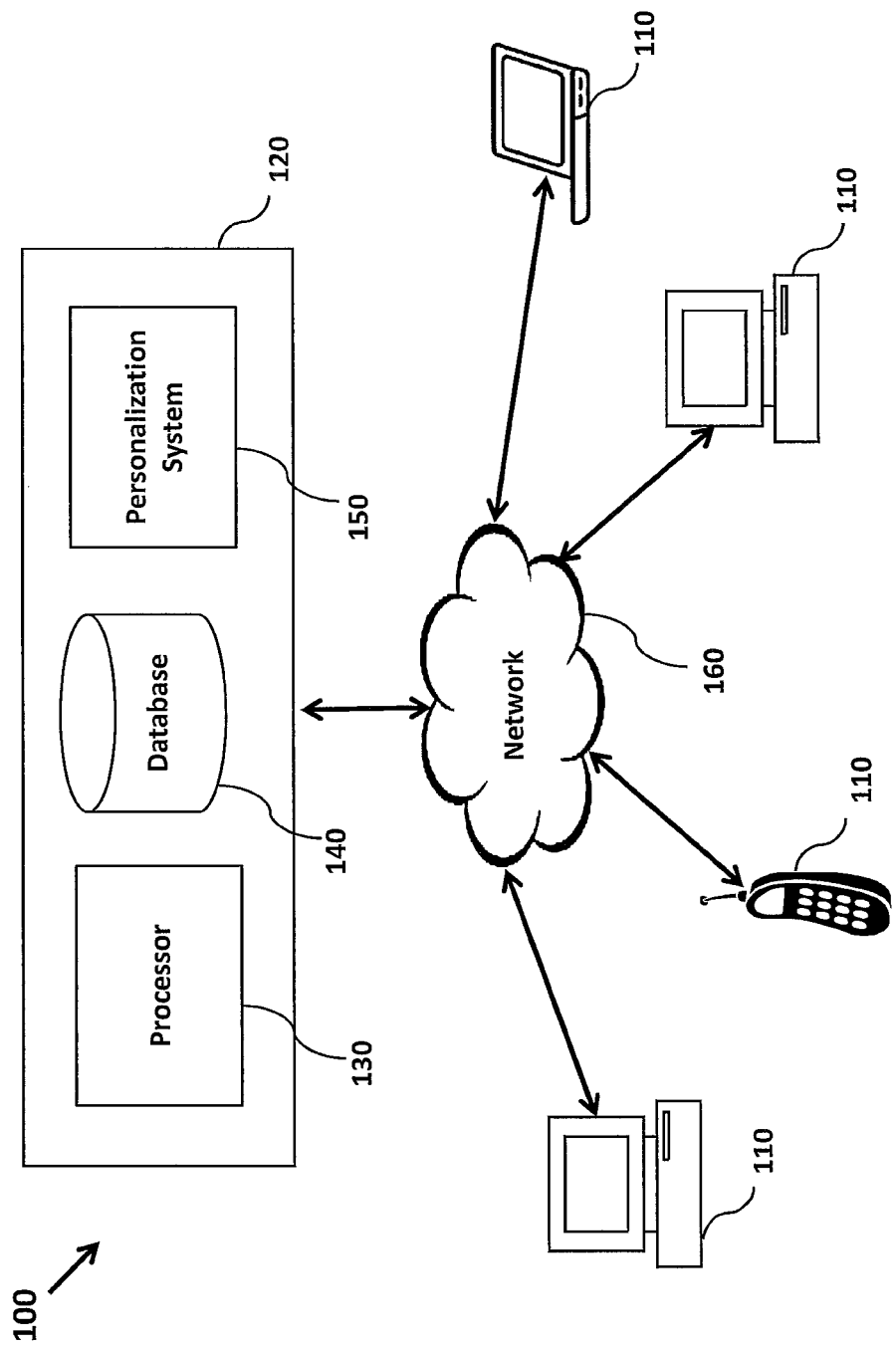
FIG. 1 is exemplary high-level network architecture for use with the principles discussed herein.

Referring now to the drawings in which like numerals represent the same or similar elements and initially to FIG. 1, a system 100 is disclosed for presenting to users personalized experiences, including with regard to content, advertising, etc., in accordance with an embodiment of the principles discussed herein. As shown therein, the system 100 includes at least one computing device, which may include at least one server 120 that is connected to a plurality of clients 110 via a network 160 (e.g., the Internet, a local area network, intranet or other network).

A network 160 may couple devices so that communications may be exchanged, such as between a server 120 and a client device 110 or other types of devices, including between wireless devices coupled via a wireless network, for example. A network 160 may also include mass storage, such as network attached storage (NAS), a storage area network (SAN), or other forms of computer or machine readable media, for example. A network 160 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Clients 110 may represent a variety of different computing devices. Exemplary client computing devices 110 include, but are not limited to, desktop computers, laptops, cell phones, personal digital assistants, wearable computing devices, radio frequency (RF) devices, display pagers, tablet devices, integrated devices combining various features, such as features of the foregoing devices, or the like.

A client device 110 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device 110 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network such as a social network. A client device 110 may also include or execute an application to communicate content, such as, for example, textual content, multimedia content, or the like. A client device 110 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

In certain embodiments, the server 120 may represent a web server that includes a processor 130 (e.g., central processing unit) and a database 140. The server 120 may be capable of sending or receiving signals, such as via a wired or wireless network, or may be capable of processing or storing signals, such as in memory as physical memory states, and may, therefore, operate as a server 120. Thus, devices capable of operating as a server 120 may include, as examples, dedicated rack-mounted servers, desktop computers, laptop computers, set top boxes, integrated devices combining various features, such as two or more features of the foregoing devices, or the like.

Servers 120 may vary widely in configuration or capabilities, but generally a server may include one or more central processing units 130 and memory. A server 120 may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Clients 110 may connect to the server 120, for example, to access web content, such as a web page or pages, a social networking site, for one or more e-commerce activities, such as to purchase items or services offered online, or for any other online interaction. The at least one server 120, e.g., in connection with the personalization system 150, therefore interfaces with the clients 110 to personalize the users' online experience as explained in further detail below.

The personalization system 150 is configured to perform a variety of functions related to personalizing individual user's online experiences based on the attitudes of the user toward specific types of online interactions. As used herein, the term "online interaction" is used in a broad sense to refer to any type of activity a user engages in over the Internet or other network. For example, an online interaction may refer to browsing or surfing the Internet, utilizing particular online systems (e.g., online banking systems, website hosting systems, social networking sites, etc.), accessing websites, communicating with other users (e.g., via email or instant messaging), engaging in online payment transactions, viewing advertisements, uploading content, viewing multimedia items (e.g., images, audio and video items), or any other type of web-based activity.

In certain embodiments, the personalization system 150 utilizes activity stream data to generate one or more attitude models that may be used to infer individual user attitudes towards particular types of online interactions. In general, the activity stream data is user-generated data that indicates the activities and interactions performed by users when engaging in particular online activities. For example, the user activity streams may include click logs which indicate items (e.g., multimedia items, hyperlinks, form elements, etc.) a user has selected or clicked on (e.g., with a mouse or pointing device) while engaging in online activities, data associated with advertisements that have been presented to a user (e.g., the number of advertisements presented to the user and the advertisements that were selected by the user), communication history data (e.g., data from e-mails, instant messages, group discussions, forums, etc.), or metric data provided by website analytic software. Other types of activity stream data may also be utilized as explained in further detail below.

The attitude models, which are generated on the basis of the activity streams, can be utilized to predict or otherwise infer a user's attitude toward a variety of different online interactions. For example, in some embodiments, the attitude models may be applied to infer a user's attitude towards trusting other users (e.g., which may indicate a user's willingness to share particular content with another user), disclosing privacy or personal information, interacting with online banking systems, interacting with online social networking systems, or other online interactions, in general or with regard to specific users or sites. The attitude models may also be used to determine a user's attitude toward topics, such as information credibility (e.g., whether the user only trusts information provided by reliable sources) or online system reliability (e.g., whether the user is cautious to utilize or trust online systems with low reliability).

Users with specific attitudes tend to engage in distinct patterns of online activity and respond to specific types of online experiences in a specific manner. Thus, by utilizing the attitude models to infer an individual's user attitude, the personalization system 150 can personalize online experiences for users accordingly. Among other things, the personalization system 150 can personalize interfaces, content, advertisements, and website features based on an understanding of the user's attitude.

For example, personalized online experiences can be created that are sensitive to a user's attitude toward interactions with other users or online systems. For instance, feedback and reassurance can be provided to users having a particular attitude that indicates that users are uncomfortable with certain online activity or that indicates that the user is likely to stop using a specific online system. In addition, adaptive incentive systems can be can be configured to provide different types of incentives (e.g., competitive rankings, achievement badges, impact metrics, group membership rights, privileges, grant of authority, etc.) to the user based on the user's attitudes.

Figure 2:
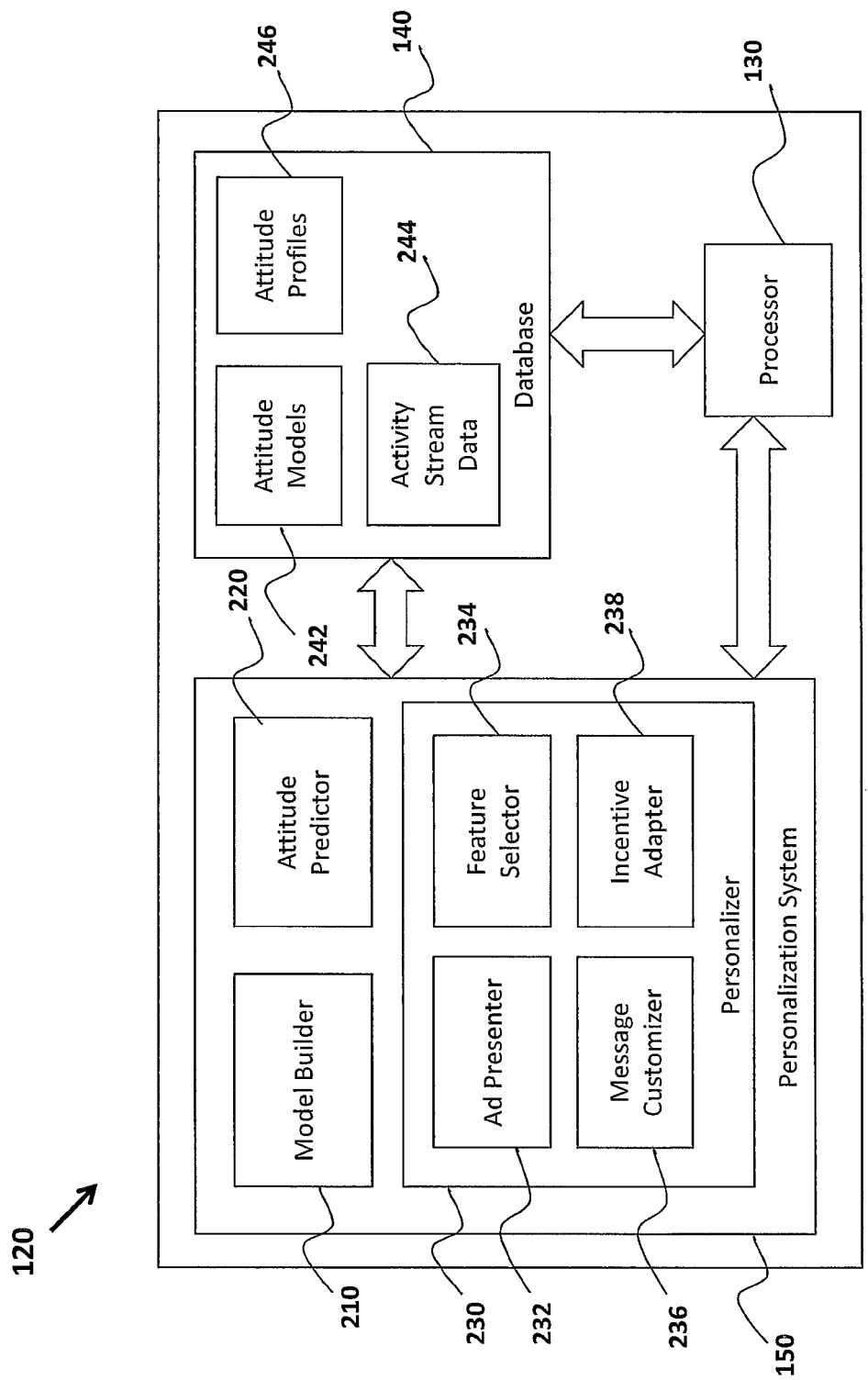
FIG. 2 is a detailed illustration of a server that is configured to personalize the presentation of content to users in accordance with one embodiment of the principles discussed herein.

FIG. 2 is a detailed illustration of the at least one server 120 that is configured to personalize the presentation of content to users or clients 110 in accordance with one embodiment of the principles discussed herein. While the server 120 may generally be described in terms of modules, which represent separate and distinct entities, it should be recognized that the functions performed by the modules may overlap and that the modules may be combined in any manner whatsoever (e.g., the modules operate as separate programs or may be implemented as part of a single program). In addition, although the modules may be described as software modules, it should be recognized that each of the modules may be implemented in software, hardware or any combination of the two.

As illustrated therein, the server 120 includes a personalization system 150 that may include a model builder 210, an attitude predictor 220, and/or a personalizer 230. The model builder 210 is configured to analyze one or more activity streams 244 to identify patterns associated with specific user attitudes. Based on the analysis of the activity streams 244, the model builder 210 generates attitude models 242 and stores the attitude models 242 in a database 140 for subsequent retrieval and use.

In certain embodiments, the model builder 210 utilizes one or more survey instruments to classify user attitudes. The survey instruments may utilize data from existing validated scales that include questions which are sufficient to identify the relevant attitude of the user for which the attitude model 242 is being constructed, or may utilize new survey scales (which may be subjected to separate validation process before being administered to users. The survey instrument may be administered to users that are associated with the data in the candidate activity streams 244. For example, in the case that instant messaging data is being utilized to generate the attitude model 242, the survey instrument may be administered to users who engage in instant messaging activities.

One benefit of applying the survey instruments in classifying user attitudes is that the model builder 210 can utilize the survey information to determine whether there are markers or indicators of online activity which substantively differ based on the attitude classification. If such differences exist, it may then be possible to create machine-learned models which accurately predict or infer the attitudes of other users (who have not participated in surveys) based on activity streams alone.

As explained above, the activity stream data 244 can be derived from a variety of different sources including, but not limited to, data associated with click logs, data that represents advertising impressions presented to users, data that indicates advertisements clicked on or selected by users, data that indicates a user's exposure to and interaction with multimedia (e.g., images, video, audio segments, etc.) or user-generated content, data associated with a user's communication history (e.g., for e-mail, instant messaging, group discussions, forums, etc.), data from social graph (e.g., mappings of relationships among members of a social networking site), and data indicative of activities engaged in by users on social networking sites. Other types of activity stream data 244 may also be utilized.

In some embodiments, the activity stream data 244 is collected by the server 120, while in other cases the activity stream data 244 is obtained from third party sources (e.g., Facebook™, Twitter™, Foursquare™, etc.). Furthermore, in some cases, the activity stream data 244 is stored in a database or memory (e.g., RAM or ROM) and processed thereafter, while in other cases the activity stream data 244 is processed in real-time as the user interacts with the server 120.

As mentioned above, the attitude models 242 are models that may be utilized to infer a user's attitude toward particular online interactions or experiences. The model builder 210 can generate attitude models for any type of attitude or belief which is relevant for online experiences. In certain embodiments, an attitude model 242 may be developed to determine a user attitude toward sharing privacy or personal information. For example, a model may be developed for users that distrust online sources, another model may be developed for users that generally trust online sources, and one or more models may be developed for users with attitudes falling within the spectrum of mistrust and trust. According to one embodiment, to generate the attitude model 242, the model builder 242 analyzes activity stream data 242 that indicates privacy preferences that were selected by users (e.g., privacy settings selected by a user for a web browser or privacy settings selected by a user on a social networking website) in conjunction with information that was derived from one or more survey instruments that were administered to the users. This analysis may be performed on a large data set that includes data from a plurality of users. Based on an analysis of this information, the model builder 210 can infer certain activity patterns, associations, and relationships in the data and generate an attitude model or models that can be applied to predict or infer attitudes of additional users.

As another example, an attitude model 242 may be developed that is capable of determining a user's attitude toward a second user or group of users (e.g., with respect to trusting or sharing personal information). To generate the model, the model builder 210 may analyze activity stream data 242 that comprises e-mail communications, instant messaging communications, and social networking metrics (e.g., social graphs or viewing permissions set by users on a social networking site to control the content that can be seen by particular users). Using this information (possibly, in conjunction with information that was derived from survey instruments), an attitude model or models 242 may be constructed that can thereafter be applied to infer a user's attitude toward another user or group of users.

Attitude models 242 may be developed for a variety of other situations as well. For example, attitude models 242 may be developed to determine a user's attitude toward utilizing online social networking systems, information credibility (e.g., whether the user only trusts information from credible sources), online banking systems (e.g., whether the user utilizes or trusts online banking systems), online system reliability (e.g., whether the user is less likely to use an online system with low reliability), or other online interactions. The above examples are not intended to be limiting. Rather, it should be recognized that attitude models 242 may be developed which are indicative of user attitudes for any type of attitude or belief which is relevant to online experiences or online interactions.

In some embodiments, the model builder 210 periodically implements a retraining procedure to adjust the attitude models 242 as new activity stream data 244, or other retraining data, is received by the server 120. The retraining procedure may account for temporal changes (e.g., changes in user behavior over a period of time), changes to emerging trends or media reports, and changes associated with newly implemented features that have become available on websites.

After generating one or more attitude models 242 that are capable of determining attitudes of users in a variety of different circumstances, the attitude predictor 220 is configured to apply the attitude models 242 to the activity stream data 244 (e.g., to stored activity stream data or to activity stream data received in real-time) to determine the attitude preferences of individual users for various different types of online interactions.

In some embodiments, the attitude predictor 220 may store the attitude information in attitude profiles 246 for each individual user. The attitude profiles 246 may include data indicating a user's attitude toward one or more online interactions or scenarios. For example, an attitude profile 246 for a user may indicate a user's attitude toward sharing privacy information, a user's attitude toward other users (e.g., on a global level or on an individual basis), a user's attitude toward advertisements (e.g., the user's interest in particular categories of advertisements), and/or any other determination or prediction that was derived from the attitude models 242. The attitudes in the profile may be expressed in a variety of ways, such as in binary form (yes or no) or on a numerical scale corresponding to the range of attitudes represented by the various attitude models.

As new activity stream data 244 is received by the server 120, the attitude predictor 220 may update the initial or previous attitude predictions or inferences. For example, suppose the attitude predictor 220 initially applied an attitude model 242 for determining a user's attitude toward utilizing messaging or communication features (e.g., e-mail or instant messaging), and the corresponding attitude profile 246 for the user was initially set to indicate that the user does not have a particular interest in utilizing messaging and communications features. If at some point in the future, the user begins utilizing instant messaging features (e.g., on social networking site), the newly generated activity stream data 244 may be used by the personalization system 150 to update the user's attitude profile to reflect the user's utilization of the instant messaging features and to indicate that the user has a particular level of interest in utilizing messaging or communication features.

After creating attitude profiles 246 for users that reflect the users' attitudes toward particular online interactions, the personalizer 230 may personalize the presentation of information (e.g., interfaces, content, website features, etc.) to users based on the attitude profiles 246. The manner in which a user's online experience is personalized can vary greatly. In the exemplary personalization system 150 illustrated in FIG. 2, the personalizer 230 includes an ad presenter 232, a feature selector 234, message customizer 236, and/or incentive adapter 238 for personalizing the presentation of data to users. It should be recognized that additional customization modules may utilized by the personalizer 230 as well.

The ad presenter 232 personalizes the presentation of advertisements to the user based on the attitude profile 246 associated with the user. This may include selecting appropriate advertisements for display to a user, determining an appropriate area on an interface for presenting the advertisement, determining the number of advertisements to be displayed to a user, or any other manner of personalizing the presentation of advertisements.

In certain embodiments, the ad presenter 232 utilizes information in the attitude profile 246 that indicates the user's attitude toward an online service utilizing privacy information in order to select advertisements to be presented to users. For example, if attitude preference information in the attitude profile 246 for a user indicates that the user is likely concerned about disclosing personal information, the ad presenter 246 may forego presenting advertisements that elicit a high degree of personal information from the user, or vice versa.

The feature selector 234 may be configured to emphasize (e.g., highlight, bolden, italicize, enlarge, etc.) or deemphasize features that are presented on an interface to a user based on the attitude profile 246 for the user. For example, if the attitude profile 246 for a particular user indicates that the user is motivated by social interaction features, the feature selector 234 may highlight messaging or communication features that are presented to users on an interface. On the other hand, if an attitude profile 246 indicates that a user is generally not receptive to utilizing social interaction features, the messaging or communication features may be deemphasized (e.g., minimized or placed in particular location that is not central to the interface) on the interface presented to the user.

The message customizer 236 is configured to personalize messages, interfaces and feedback provided to users based on the attitude profile 246 associated with a user. For example, an attitude profile 246 for a user may indicate that a user has a high degree of uncertainty about the operation of a given online system, or may indicate that a user needs additional assurance regarding a particular system. In this case, the message customizer 236 may personalize a message (e.g., an e-mail) or interface presented to the user to include a more detailed explanation regarding the online system, or may provide a more detailed explanation regarding how content provided by the user will be utilized by the online system.

The incentive adapter 238 is configured to personalize the presentation of incentives to users based on the attitude profile 246 of a user. The incentive adapter 238 provides different types of incentives (e.g., competitive rankings, achievement badges, impact metrics, group membership, rights, privileges, and authority to perform actions or access content) to users. Thus, the type of incentive presented to a user can be varied based on the attitude profile 246 of a user. For example, if the attitude profile 246 indicates that a given user tends to be pro-social, the incentive adapter 238 may emphasize or present incentives to the user which focus on group outcomes and rewards. On the other hand, if the attitude profile 236 indicates that a user tends to be self-interested, the incentive adapter 238 may emphasize or present incentives to the user which focus on individual outcomes or rewards.

Figure 3:
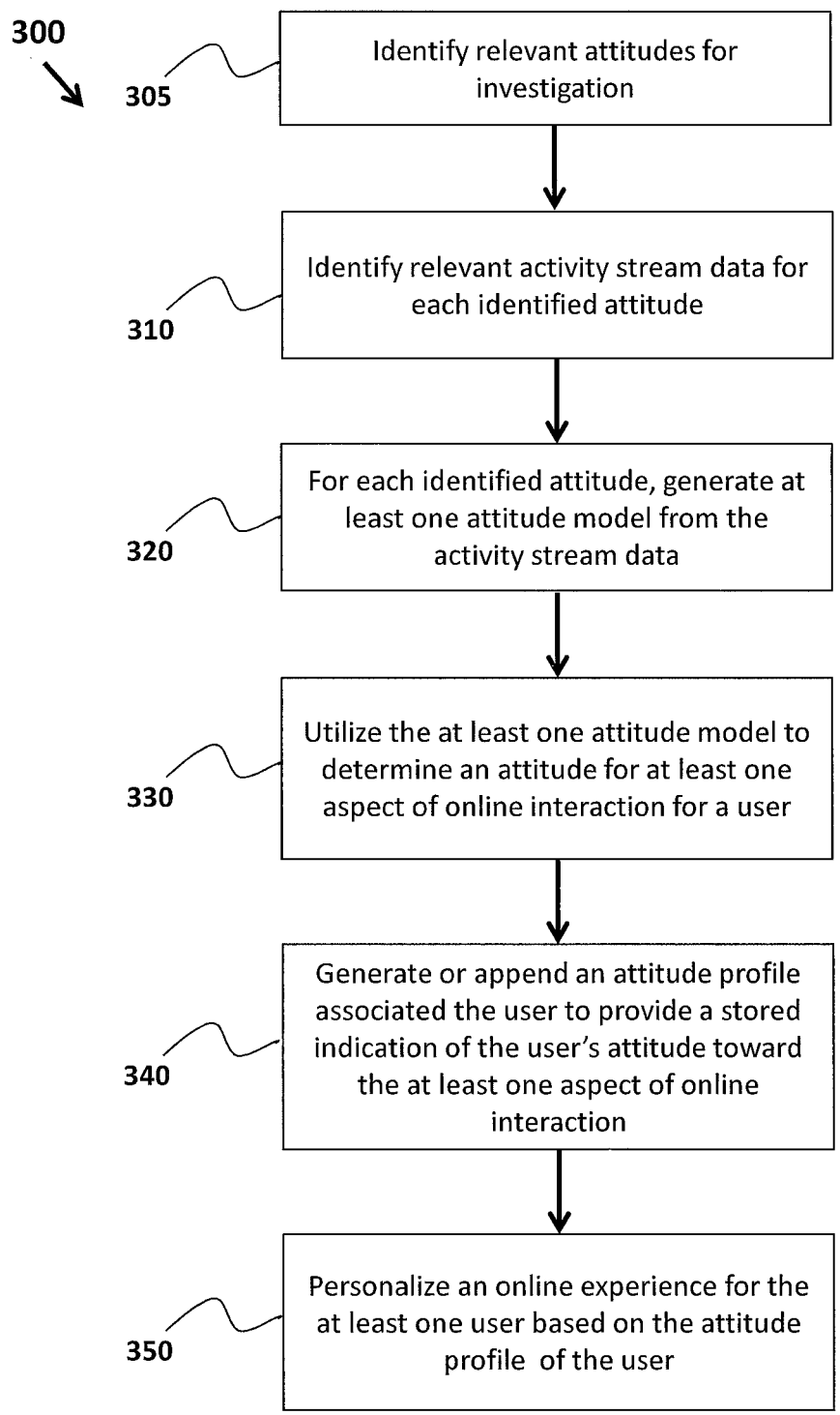
FIG. 3 is a method for personalizing an online experience of a user in accordance with one embodiment of the principles discussed herein.

Moving on to FIG. 3, a method 300 is disclosed for personalizing an online experience for a user in accordance with one embodiment of the principles discussed herein. The method 300 may be executed by the personalization system 150 illustrated in FIGS. 1 and 2.

Initially, at least one attitude is selected for investigation (step 305). As explained above, any attitude associated with a user's online experience can be selected for investigation. Exemplary attitudes may include a user attitudes associated with privacy concerns, advertisements, multimedia, online social interaction, user responsiveness to incentives, and a user's willingness to trust other users or online systems (e.g., online banking systems or online system which collect user generated content).

Relevant activity stream data 244 is identified for each attitude that is identified (step 310). For example, if an identified attitude pertains to a user's privacy concerns, one or more activity data streams 246 can be identified that would permit the model builder 210 to infer or determine a user's attitude towards privacy or towards the user's willingness to disclose information (e.g., activity stream data 246 that indicates a user's privacy settings on a browser and social network). The identification or selection of relevant activity stream data 246 can be performed by the personalization system 150 or manually by a human user. A number of different sources can be utilized to assist in identifying the activity streams 246 that are relevant to a particular attitude (e.g., literature discussing associations between a user's online activity and attitude, prior experimentation, or known associations).

At least one attitude model 242 is generated from the identified activity stream data 244 for each of the attitudes that are subject to investigation (step 320). As explained above, in certain embodiments, information derived from survey instruments may also be utilized in conjunction with the activity stream data 244 to generate the at least one attitude model 242. The attitude models 242 associated with each of the attitudes being investigated may be utilized to determine a user's attitude toward particular online interactions or experiences (step 330). For example, a first attitude model derived from a first set of activity stream data 244 may be utilized to determine a first attitude of a user toward disclosing privacy information, while a second attitude model 242 derived from a second set of activity stream data 244 may be utilized to determine a second attitude of the user toward incentive systems.

After the user attitudes are predicted or inferred utilizing the attitude models, an attitude profile 246 is generated for each user (step 340). The attitude profile 246 stores data indicative of the user's attitudes toward the particular online interactions or experiences. If an attitude profile 246 already exists for a particular user, there is no need to generate a new attitude profile 246 for the user. In this case, the existing attitude profile 246 can be updated to reflect the newly determined attitudes for the user.

As the user engages in various online experiences or interactions (e.g., surfing the Internet, interacting with social networks, etc.), the user's attitude profile 246 may be utilized to personalize the online experience for the user (step 350). As explained above, personalizing the online experience of the user may vary greatly, and may include customizing interfaces presented to the user, customizing messages or content presented to the user, emphasizing or deemphasizing website features, customizing the presenting of advertisements or customizing incentives presented to the user.

Having described an exemplary manner of applying the present principles to personalize the online experience of a user, further details are provided below to illustrate the manner in which attitude models 242 may be generated and the manner in which attitude profiles 246 may be created and maintained.

Figure 4:
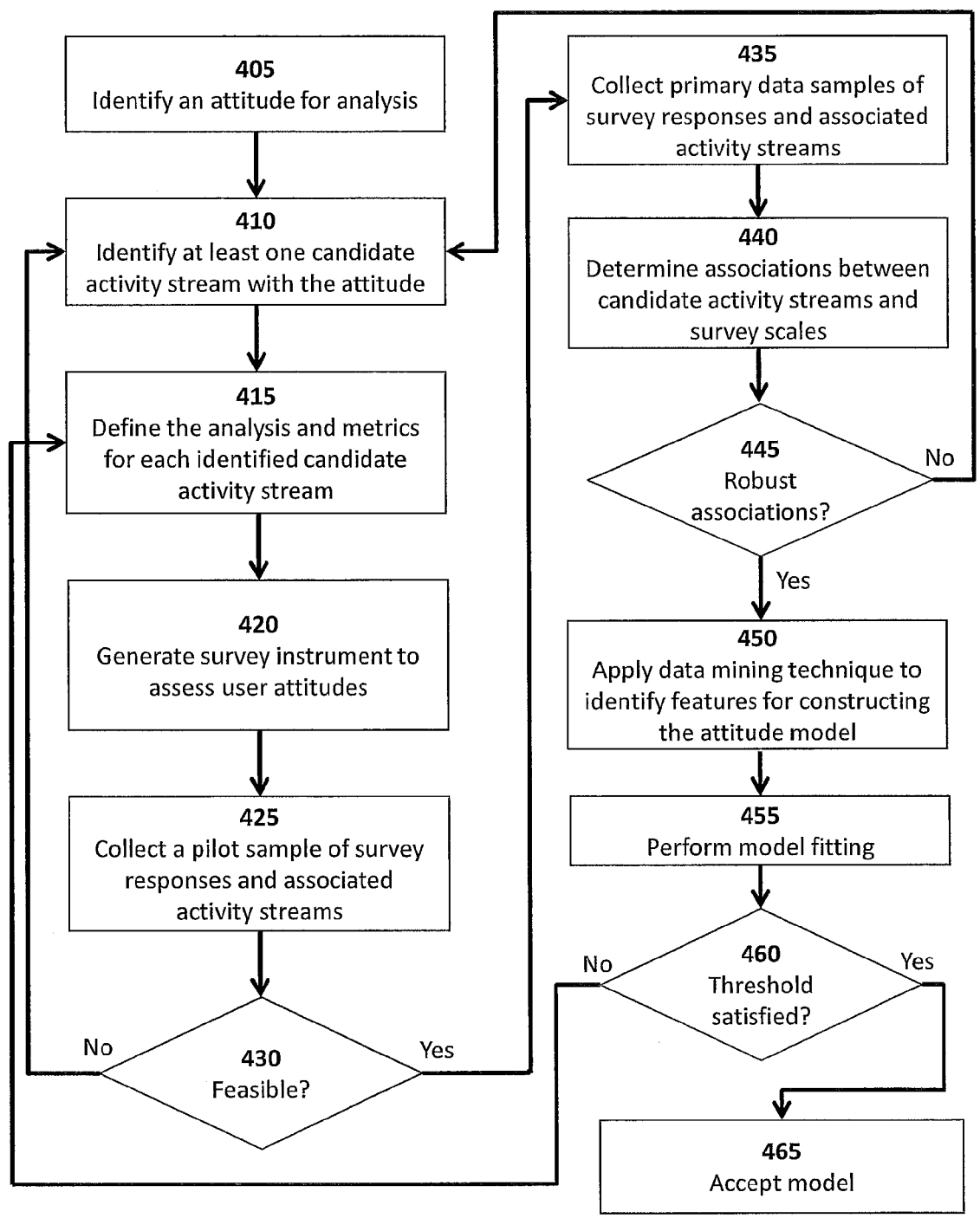
FIG. 4 is a method for generating a model for predicting user attitudes in accordance with one embodiment of the principles discussed herein.

FIG. 4 illustrates an exemplary method 400 for generating an attitude model 242 that can be applied to activity stream data 244 to determine user attitudes. Initially, a particular attitude may be identified for analysis (step 405), along with one or more candidate activity streams (step 410). These steps may be performed in the same or similar manner as described above.

Once the activity stream data 244 has been identified, a corresponding set of metrics and analysis techniques are defined for each set of activity stream data 244 (step 415). To demonstrate the manner in which metrics and analysis techniques may be defined for an activity stream, consider an example in which the selected attitude for investigation pertains to the user's attitude toward utilizing communication features on a social networking website. In this case, the selected activity stream data 244 may comprise data which tracks a user's interactions with a social network (e.g., social graphs, utilization of communication features, user profile data, user connections, user profile content, etc.). From the social network data, metrics may be defined which indicate the particular messaging features (e.g., instant messaging or email features) that are being utilized by a user, how frequently the communication features are utilized, and the number of peers the user communicated with using the communication features. A set of analysis techniques may also be utilized to determine how the metric information is extracted from the social networking data (e.g., by parsing entries in a database and extracting information stored in particular fields), and how the metric information can be utilized as a basis for generating an attitude model 242 that is able to infer user attitudes toward utilizing the communication features.

Next, a survey instrument is generated to assess the user attitudes (step 420). The survey instrument may be administered to users that are associated with the data in the candidate activity streams 244. For example, in the case that social networking data is being utilized to generate the attitude model 242, the survey instrument may be administered to users who are associated with the social networking data (e.g., the actual users that generated the social network).

In certain embodiments, the survey instrument may utilize data from existing validated scales that comprise a collection of questions intended to identify the relevant attitude of the user for which the attitude model 242 is being constructed. In the case that the survey instrument is not drawn from existing validated scales, new survey scales may initially be validated through a separate process or procedure prior to being administered to users.

After developing or identifying a suitable survey instrument, a pilot sample of survey responses may be collected from the users along with a new set of activity stream data 244 for the users (step 425). This may include presenting the survey instrument to users as the users engage in online interactions and generate new activity stream data 244. For example, if social network data is being utilized to generate the attitude model 242, a survey instrument may be presented to users as the users engage in social networking activities. Both the survey responses and a new set of user activity data associated with the social networking activities may be collected.

One of the purposes for collecting the survey responses and newly generated activity data is to assess the feasibility of the relationship between the focal attitude (i.e., the attitude identified in step 405) and the selected candidate activity streams 244 (i.e., the candidate activity streams identified in step 410). The collected pilot data is able to accurately identify user attitudes with respect to particular online interactions by eliciting explicit responses from users as they engage in the relevant online interactions and produce activity stream data 244 that can be correlated to the provided responses. As such, the pilot data may be utilized as a basis for determining whether the selected candidate activity streams 244 and associated metrics and analysis techniques defined for the candidate activity streams 244 can be utilized to accurately infer the focal attitude of a user.

Based on the collected pilot data, a determination is made as to whether the relationship between the focal attitude and the selected candidate activity streams is feasible from a preliminary standpoint (step 430). If it is determined that the relationship is not feasible, the method 400 may proceed back to step 410 to identify or select different candidate streams for creating the attitude model 242. However, in certain cases, the lack of feasibility between the focal attitude and the selected candidate activity streams may not be a result of the candidate streams which were selected, but may rather result from a poor definition of the metrics and analysis techniques, or from a poorly generated survey instrument that was administered to the users. In these cases, the method 400 may only revert back to either step 415 or step 420, respectively.

In the alternative case where it is determined that the relationship between the focal attitude and the selected candidate activity streams is feasible from a preliminary standpoint, primary data samples of survey responses and associated activity stream data are collected (step 435). The pilot data may be utilized to determine a target sample size for the collection of primary data samples.

After collecting the primary data samples of survey responses, an associational analysis is applied to determine the statistical relationships between specific aspects of the candidate data feeds and the survey scales, and to identify a list of candidate features or metrics that may be utilized to generate the attitude model 242 (step 440). A variety of different associational analyses may be utilized to accomplish this including, but not limited to: correlation, analysis of variance (ANOVA), T-tests or regression (e.g., ordinary least squares, logistic or negative binomial).

Next, a determination is made as to whether the associations or relationships identified by the associational analysis are sufficiently robust (step 445). In that case that it is determined that the associations are not sufficiently robust, the method 400 may revert back to step 410 to select new candidate activity stream data 244. Once again, it may not be necessary to revert all the way back to step 410 if the weakness of the associations is not a result of the candidate activity streams that were selected. Rather, if the weakness of the associations is a result of poorly defined metrics and analysis techniques or from a poorly generated survey instrument, the method 400 need only revert back to step 415 or step 420, respectively.

If it is determined that the associations or relationships identified by the associational analysis are sufficiently strong, the method may proceed to step 450 where data mining techniques are applied to identify additional candidate features or metrics that may be utilized to construct the attitude model 242. As mentioned above, the associational analysis may also identify the candidate features for constructing the attitude model 242. Thus, the subsequent application of data mining techniques may supplement or revise the features identified by the associational analysis. In one embodiment, the data mining technique utilized to identify the features comprises an "all-subsets" regression analysis technique. The all-subsets regression analysis constructs a large number of combinatorial models and identifies a combination of activity descriptors that predict the greatest variance in the focal activity scale.

Utilizing the candidate features identified by the associational analysis and data mining, model fitting techniques may be applied to construct one or more predictive, probabilistic or machine learned attitude models 242 (step 455). A variety of different machine learning techniques may be utilized to construct the attitude models 242 including, but not limited to, simple naïve Bayesian model techniques or support vector machine (SVM) techniques. In certain embodiments, constructing the models may include applying a plurality of different model fitting techniques to a plurality of different model permutations, and selecting the attitude model 242 that provides the best fit. Selecting the attitude model 242 that provides the best fit may involve evaluating standardized metrics associated with the models, such as precision, recall and F-measure (which represents the break-even point of precision and recall).

After selecting the candidate attitude model 242 that provides the best fit, the selected candidate attitude model 242 may be compared to a threshold value that represents the minimum level of predictive power that is acceptable for the attitude model 242 (step 460). If the model 242 does not satisfy the desired threshold, the method 400 returns to step 415 and proceeds forward by honing the activity metrics, analysis techniques and survey instruments. In some alternative embodiments, rather than reverting back to step 415, the power analysis techniques are applied to alter the sample size associated with collection of the primary data samples.

On the other hand, if the threshold is satisfied, the attitude model 242 is accepted (step 460). At this point, the selected attitude model 242 may be utilized by the personalization system 150 to determine or predict the focal attitude from activity stream data 244 and to generate attitude profiles 246 for users.

Figure 5:
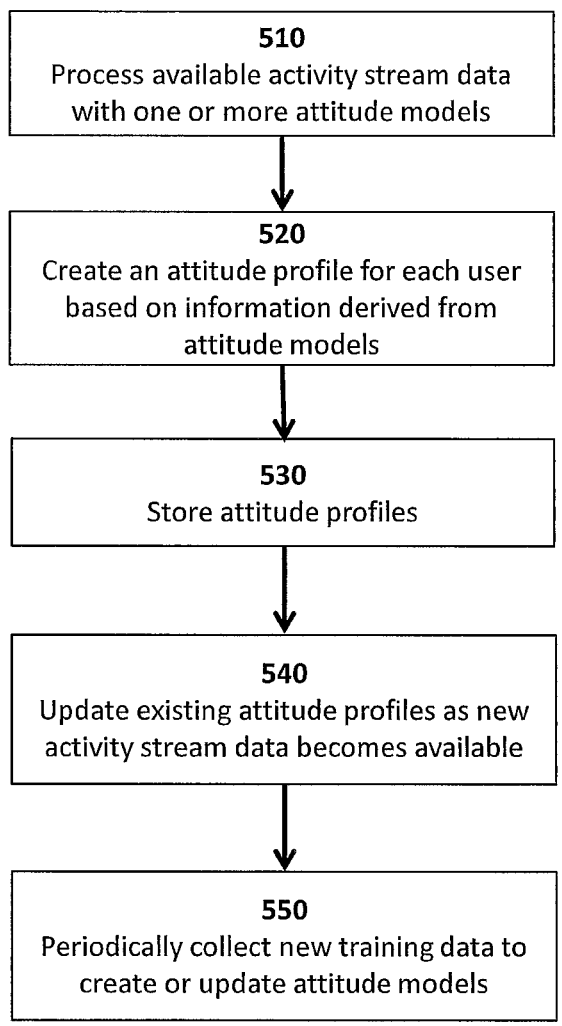
FIG. 5 is a method for creating and maintaining attitude profiles in accordance with one embodiment of the principles discussed herein.

FIG. 5 illustrates an exemplary method 500 for creating and maintaining attitude profiles 246 for users. As shown therein, one or more sets of activity stream data 244 are processed utilizing one or more attitude models 242 (step 510). This activity stream data 244 is processed to identify an attitude for one or more users associated with the activity stream data 244 (i.e., for the users that generated the activity stream data 244 that is being processed). This may involve batch processing stored activity stream data 244 with the attitude models 242, or processing the activity stream data 244 in real-time with the attitude models 242.

An attitude profile 246 is created for each user associated with the activity stream data 244 based on the attitude preferences derived by the attitude models 242 for the users (step 520). The attitude profile 246 associated with each user includes "attitude preferences" for the user which indicate the user's attitude towards particular online interactions. For example, the attitude profile 246 may store attitude preference information which indicates a user's attitude toward a plurality of different users (e.g., a list of trusted users and a list of distrusted users), particular online systems (e.g., towards banking websites), utilizing a social network (e.g., whether a user is a member of social network or how frequently a user logs in to a social network), or utilizing particular features on websites (e.g., credit card processing modules on websites or communication features on social networks). In some embodiments, an attitude profile 246 stores a single attitude preference for a user, while in other embodiments an attitude profile 246 stores multiple attitude preferences for a user.

The attitude preference information stored in the attitude profiles 246 may represented in different ways. For example, in certain embodiments, the attitude preference information may be represented by a simple binary indicator (e.g., yes/no or 0/1) to represent a user attitude. In other cases, the attitude preference information may be represented by a score (e.g., on a scale for 1 to 10) how strongly a user's attitude is toward a particular type of online interaction.

In certain embodiments, the attitude profiles 246 may include additional information besides attitude preference information. For example, the attitude profiles 246 may include personal information (e.g., name, contact information, age, gender, etc.) about the user associated with the profile or may include statistics associated with the user's activity stream data 244.

After the activity stream data 244 is processed and the attitude profiles 246 are created, the attitude profiles 530 are stored on a storage medium (step 530). In some embodiments, the attitude profiles 246 may be stored in a database 140 located on a server 120 associated with the personalization system 150. Once the attitude profiles 246 are stored, the personalization system 150 may utilize the attitude profiles 246 to personalize online experiences for the user.

As new activity stream data 244 is made available to the personalization system 150, the attitude preference information in the attitude profiles 246 may be updated accordingly (step 540). In some embodiments, new activity stream data 244 may become available by tracking subsequent online interactions or online activities of the users or by purchasing activity stream data 244 from a third party (e.g., new click log information may be purchased from a third party website).

The new activity stream data 244 may provide a basis for altering the attitude preference information stored in the attitude profiles 246. For example, when an attitude profile 246 is initially created for a user, an initial determination may be made that the user has a particular attitude preference toward a particular type of online interaction. The initial creation of an attitude profile 246 may include attitude preference information which indicates that a user is not receptive to sharing personal information. This initial assessment of the user's attitude may be based on activity stream data 246 which indicates that a user does not publicly share his personal information on social networking sites or may be based on activity stream data 246 which indicates that the user does not provide personal information to online marketers. However, the reception of new activity stream data 244 may provide a basis for altering the attitude preference information to indicate that the user is receptive to sharing personal information (e.g., if the new activity stream data 244 indicates that the user has made his user profile publicly available on the social networking site or engaged in other online interactions that involved the sharing of personal information).

Periodically, the personalization system 150 may create attitude new attitude models 242 and/or update existing attitude models 242 (step 550). For example, if a new feature is added to a website and the newly received activity stream data 244 provides information on how the feature is being utilized by users, a new attitude model 242 may be created to determine user attitudes toward the new feature.

Similarly, the newly received activity stream data 244 may provide a basis for refining an existing attitude model 242. For example, suppose an attitude profile 246 already existed for determining a user's attitude preference toward utilizing communication features on a social networking site. If a new communication feature is added to the social networking site, the existing attitude model 242 can be supplemented in manner which considers the new feature in determining the attitude preference of a user.

Based on the above description, it can be seen how the personalization system 150 can be adapted in various ways to personalize an online experience of a user. By utilizing the attitude profile 246 of a user, the personalizer 230 can personalize various aspects of a user's online experience and tailor the user's online experience to conform to user's attitude preference.

Numerous examples can be provided to demonstrate how a user's online experience can be tailored to accommodate the user's attitude preference. In some embodiments, the personalizer 230 can tailor the presentation of advertisements to a user. For example, if the attitude profile 246 includes attitude preference information for a user suggesting that the user does not engage in online retail shopping, the personalizer 230 may take this into account and forego the presentation of advertisements to the user which provide discounts for online shopping websites.

Similarly, if attitude preference information indicates that a user is not receptive to sharing content (e.g., images or videos) on a social networking site because the user is distrustful of how this information may be utilized, the personalizer 150 may emphasize or provide feedback to the user which reassures the user that any content provided by the user will be kept private and will not be sold to marketers.

While the above examples of personalizing an online experience of a user are provided for illustrative purposes, these examples are not mean to be limiting. Rather, it should be recognized that the online experience of a user can be customized in any manner whatsoever utilizing the attitude preference information stored in a user's attitude profile 246.

The figures in this disclosure are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Those skilled in the art will appreciate that the invention may be practiced in network computing environments with many types of computer system configurations, including mobile telephones, PDA, pagers, hand-held devices, laptop computers, personal computers, multi-processor systems, microprocessor-based or programmable consumer electronics, network PCs, minicomputers, mainframe computers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for personalizing a user online experience, the method comprising:

constructing, via at least one computing device, at least one attitude model based, at least in part, on an activity stream indicative of activities and/or interactions performed by users during engaging in online activities, wherein the activity stream at least comprises: click logs, logs related to advertisements presented to the user, metrics from website analytic software, logs indicative of user exposure to or interaction with multimedia or user-generated content, social graphs, logs indicative of activity on social networking websites, e-mail communications, instant messaging communications, social networking metrics, or a combination thereof, and wherein the at least one attitude model is indicative of a user attitude toward at least one online interaction;

via the at least one computing device, generating an attitude profile for at least one user based at least partially on the at least one attitude model, wherein the attitude profile indicates a user's attitude toward the at least one online interaction; and via the at least one computing device, personalizing an online experience of the at least one user based at least partially on the user's attitude in the attitude profile.

2. The method as recited in claim 1, wherein the constructing at least one attitude model comprises: identifying a focal attitude for investigation; and identifying relevant portions of the activity stream associated with the focal attitude for generating the at least one attitude model.

3. The method as recited in claim 1, further comprising: specifying one or more metrics for the activity stream to be used in constructing the at least one attitude model.

4. The method as recited in claim 2, further comprising: administering a survey instrument to users for assessing feasibility of the relationship between the focal attitude and the identified activity stream.

5. The method as recited in claim 2, further comprising: performing a model fitting technique to select an attitude model from a plurality of candidate attitude models.

6. The method as recited in claim 1, further comprising: updating the attitude profile of the at least one user based at least partially on a newly received activity stream.

7. The method as recited in claim 1, further comprising: periodically supplementing the at least one attitude model to adjust a manner in which the at least one attitude model determines attitudes for the at least one user.

8. The method as recited in claim 1, wherein personalizing the online experience of the at least one user includes at least one of: personalizing presentation of advertisements to the user based at least partially on the attitude profile for the at least one user; emphasizing or de-emphasizing features of an interface presented to the at least one user based at least partially on the attitude profile for the at least one user; personalizing feedback provided to the at least one user based at least partially on the attitude profile for the at least one user; or personalizing incentives presented to the at least one user based at least partially on the attitude profile for the at least one user.

9. A system for personalizing an online experience comprising:
at least one server to:
construct at least one attitude model based, at least in part, on an activity stream to be indicative of activities and/or interactions to be performed by users to be engaged in online activities, wherein the activity stream is to at least comprise: click logs, logs related to advertisements presented to the user, metrics from website analytic software, logs indicative of user exposure to or interaction with multimedia or user-generated content, social graphs, logs indicative of activity on social networking websites, e-mail communications, instant messaging communications, social networking metrics, or a combination thereof, and wherein the at least one attitude model is to be indicative of a user attitude toward at least one online interaction;
generate an attitude profile for at least one user based at least partially on the at least one attitude model, wherein the attitude profile to indicate a user's attitude toward the at least one online interaction; and
personalize an online experience of the at least one user to be based on the user's attitude in the attitude profile.

10. The system as recited in claim 9, wherein the at least one server to: identify a focal attitude for investigation; and identify relevant portions of the activity stream to be associated with the focal attitude to generate the at least one attitude model.

11. The system as recited in claim 9, wherein the at least one server to: specify one or more metrics for the activity stream to be used in constructing the at least one attitude model.

12. The system as recited in claim 10, wherein the at least one server to: administer a survey instrument to users for assessing feasibility of the relationship between the focal attitude and the identified activity stream.

13. The system as recited in claim 9, wherein the at least one server to: perform a model fitting technique to select an attitude model from a plurality of candidate attitude models.

14. The system as recited in claim 9, wherein the at least one server to: update the attitude profile of the at least one user based at least partially on a newly to be received activity stream.

15. The system as recited in claim 9, wherein the at least one server to: periodically supplement the at least one attitude model to adjust a manner in which the at least one attitude model is to determine attitudes for the at least one user.

16. The system as recited in claim 9, wherein the at least one server to: personalize presentation of advertisements to the user based at least partially on the attitude profile for the at least one user; emphasize or de-emphasize features on an interface to be presented to the at least one user based at least partially on the attitude profile for the at least one user; personalize feedback to be provided to the at least one user based at least partially on the attitude profile for the at least one user; or personalize incentives to be presented to the at least one user based at least partially on the attitude profile for the at least one user.

17. A non-transitory computer storage medium comprising computer executable instructions to:
construct at least one attitude model based, at least in part, on an activity stream to be indicative of activities and/or interactions to be performed by users to be engaged in online activities, wherein the activity stream is to at least comprise: click logs, logs related to advertisements presented to the user, metrics from website analytic software, logs indicative of user exposure to or interaction with multimedia or user-generated content, social graphs, logs indicative of activity on social networking websites, e-mail communications, instant messaging communications, social networking metrics, or a combination thereof, and wherein the at least one attitude model is to be indicative of a user attitude toward at least one online interaction;
generate an attitude profile for at least one user based at least partially on the at least one attitude model, wherein the attitude profile to indicate a user's attitude toward the at least one online interaction; and
personalize an online experience of the at least one user to be based on the user's attitude in the attitude profile.

18. The computer storage medium as recited in claim 17, wherein the executable instructions are further to specify one or more metrics for the activity stream to be used in constructing the attitude model.

19. The computer storage medium as recited in claim 17, wherein the executable instructions are further to perform a model fitting technique to select an attitude model from a plurality of candidate attitude models.

20. The computer storage medium as recited in claim 17, wherein the executable instructions are further to personalize presentation of advertisements to the user based at least partially on the attitude profile for the at least one user; emphasize or de-emphasize features on an interface to be presented to the at least one user based at least partially on the attitude profile for the at least one user; personalize feedback to be provided to the at least one user based at least partially on the attitude profile for the at least one user; or personalize incentives to be presented to the at least one user based at least partially on the attitude profile for the at least one user.

21. A method for personalizing a user experience, the method comprising:
constructing, via at least one computing device, at least one attitude model based, at least in part, on an activity stream indicative of activities and/or interactions performed by users during engaging in online activities, wherein the at least one attitude model is indicative of a user attitude toward at least one online interaction, and wherein constructing at least one attitude model further comprises:
identifying an attitude for analysis and identifying at least one candidate activity stream related to the identified attitude;
generating a survey instrument to be administered to users and associated with the at least one candidate activity stream;
collecting responses to the generated survey instrument;
employing an associational analysis to determine one or more statistical relationships between the at least one candidate activity stream and the collected responses to the generated survey instrument, and wherein the constructed at least one attitude model is based, at least in part, on the one or more statistical relationships;

via the at least one computing device, generating an attitude profile for at least one user based at least partially on the at least one attitude model, wherein the attitude profile indicates a user's attitude toward the at least one online interaction; and via the at least one computing device, personalizing an online experience of the at least one user based at least partially on the user's attitude in the attitude profile.

* * * * *